United States Patent
Kalbag (10) Patent No.: US 8,953,569 B2
(45) Date of Patent: *Feb. 10, 2015

(54) WIRELESS MOBILE COMMUNICATION DEVICE WITH AUTONOMOUS WI-FI CONTROL BASED ON LOCATION OF DEVICE

(75) Inventor: Rohit Satish Kalbag, Bridgewater, NJ (US)

(73) Assignee: Cellco Partnership, Basking Ridge, NJ (US)

(*) Notice: Subject to any disclaimer, the term of this patent is extended or adjusted under 35 U.S.C. 154(b) by 552 days.

This patent is subject to a terminal disclaimer.

(21) Appl. No.: 12/850,393

(22) Filed: Aug. 4, 2010

(65) Prior Publication Data

US 2012/0033654 A1    Feb. 9, 2012

(51) Int. Cl.
| | | |
|---|---|---|
| H04W 4/00 | (2009.01) | |
| H04W 52/02 | (2009.01) | |
| H04W 84/12 | (2009.01) | |
| H04M 1/725 | (2006.01) | |

(52) U.S. Cl.
CPC ...... *H04W 52/0277* (2013.01); *H04M 2250/06* (2013.01); *H04W 84/12* (2013.01); *H04M 1/72572* (2013.01); *H04M 2250/10* (2013.01)
USPC .......................................... 370/338; 370/328

(58) Field of Classification Search
USPC .......... 370/311, 328, 329, 252, 338, 464, 465
See application file for complete search history.

(56) References Cited

U.S. PATENT DOCUMENTS

| | | | |
|---|---|---|---|
| 8,638,760 | B2 | 1/2014 | Jarzra et al. |
| 2006/0046736 | A1 | 3/2006 | Pering et al. |
| 2006/0067299 | A1 | 3/2006 | Caspi et al. |
| 2007/0033197 | A1 | 2/2007 | Scherzer et al. |
| 2007/0129092 | A1 | 6/2007 | Doradla et al. |
| 2008/0247344 | A1 | 10/2008 | Bahl et al. |
| 2008/0261616 | A1 | 10/2008 | Wu |

(Continued)

FOREIGN PATENT DOCUMENTS

EP    2190175    5/2010

OTHER PUBLICATIONS

"Broken—Definition," Merriam-Webster Dictionary, http://www.merriam-webster.com/dictionary/broken, three pages, retrieved from the internet on Jan. 6, 2014.

(Continued)

*Primary Examiner* — Michael Thier
*Assistant Examiner* — Feben M Haile (57) ABSTRACT

A wireless mobile communication device may include a Wi-Fi data communication system, an operational condition detection system, and a Wi-Fi activation system. The operational condition detection system may include a location sensor. The operational condition detection system may be configured to detect an operational condition of the wireless mobile communication device, other than actuation of a user-operated control, including when the location sensor determines that the wireless mobile communication device is near a Wi-Fi access point. The Wi-Fi activation system may be configured to autonomously turn power on to the Wi-Fi data communication system upon detection of an operational condition of the wireless mobile communication device by the operational condition detection system, other than actuation of a user-operated control, including when the location sensor senses that the wireless mobile communication device is near a Wi-Fi access point.

19 Claims, 3 Drawing Sheets

(56) References Cited

U.S. PATENT DOCUMENTS

| | | | |
|---|---|---|---|
| 2008/0305786 A1 | 12/2008 | Arumi et al. | |
| 2009/0124284 A1 | 5/2009 | Scherzer et al. | |
| 2009/0141695 A1* | 6/2009 | Karaoguz et al. | 370/338 |
| 2009/0181655 A1* | 7/2009 | Wallace et al. | 455/414.3 |
| 2009/0192709 A1 | 7/2009 | Yonker et al. | |
| 2009/0239574 A1* | 9/2009 | Hussain | 455/552.1 |
| 2009/0278705 A1 | 11/2009 | Chhabra et al. | |
| 2010/0008291 A1 | 1/2010 | Leblanc et al. | |
| 2010/0322214 A1 | 12/2010 | Workman et al. | |
| 2011/0050164 A1* | 3/2011 | Partovi et al. | 320/108 |
| 2011/0286437 A1* | 11/2011 | Austin et al. | 370/338 |

OTHER PUBLICATIONS

"Fixing a Broken Wireless LAN Connection," Document ID: 30218, Cisco Systems, http://www.cisco.com/c/en/us/support/docs/wireless-mobility/wireless-lan-wlan/30218-wlantroublshoot.html, 11 pages, Oct. 19, 2009.

* cited by examiner

WIRELESS MOBILE COMMUNICATION DEVICE WITH AUTONOMOUS WI-FI CONTROL BASED ON LOCATION OF DEVICE

BACKGROUND

1. Technical Field

This disclosure relates to wireless mobile communication devices which are configured to communicate data over Wi-Fi and optionally over a cellular data communication channel.

2. Description of Related Art

Many wireless mobile communication devices, such as many smartphones, are configured to communicate data over both a cellular data communication channel and WiFi. The user typically decides which communication channel to use.

Some cellular network providers prefer that Wi-Fi be used when available. This offloads the data communication load from their cellular data communication network.

However, users may be hesitant to turn on their Wi-Fi data communication system because it drains battery power and because it may be inconvenient to do so. Thus, users may not use Wi-Fi, even when available.

SUMMARY

A wireless mobile communication device may include a Wi-Fi data communication system, an operational condition detection system, and a Wi-Fi activation system.

The Wi-Fi data communication system may be configured to wirelessly connect to a Wi-Fi access point and to wirelessly communicate data between the wireless mobile communication device and the Wi-Fi access point.

The operational condition detection system may include a location sensor. The operational condition detection system may be configured to detect an operational condition of the wireless mobile communication device, other than actuation of a user-operated control, including when the location sensor determines that the wireless mobile communication device is near a Wi-Fi access point.

The Wi-Fi activation system may be configured to autonomously turn power on to the Wi-Fi data communication system upon detection of an operational condition of the wireless mobile communication device by the operational condition detection system, other than actuation of a user-operated control, including when the location sensor senses that the wireless mobile communication device is near a Wi-Fi access point.

The wireless mobile communication device may a data storage system configured to store locations of Wi-Fi access points and information indicative of the usage of each Wi-Fi access point by the wireless mobile communication device for data communication. The Wi-Fi activation system may be configured to autonomously turn power on to the Wi-Fi data communication system only when the location sensor senses that the wireless mobile communication device is near a Wi-Fi access point that has been classified as high usage.

The detection system may include a battery power level detector configured to detect information indicative of the charge level of a battery that powers the wireless mobile communication device. The Wi-Fi activation system may be configured not to autonomously turn power on to the Wi-Fi data communication system, notwithstanding detection of an operational condition of the wireless mobile communication device by the operational condition detection system, when the battery power level detector detects that the charge level of the battery is below a pre-determined threshold.

The Wi-Fi activation system may be configured to autonomously turn power off to the Wi-Fi data communication system, after autonomously turning power on to the Wi-Fi data communication system, upon detection of an operational condition of the wireless mobile communication device by the operational condition detection system, other than actuation of a user-operated control.

The operational condition detection system may include a Wi-Fi connection detector configured to detect when a connection to a Wi-Fi access point has been established. The operational condition may be when the Wi-Fi connection detector detects that a Wi-Fi connection to a Wi-Fi access point cannot be established.

The Wi-Fi activation system may include a power-off delay timer configured to prevent the Wi-Fi activation system from concluding that connection to a Wi-Fi access point cannot be established until after pre-determined time period after the Wi-Fi data communication system has been turned on. The pre-determined period may be in excess of 15 minutes.

The Wi-Fi connection detector may be configured to detect when a connection to a Wi-Fi access point has been broken. The operational condition may be when the Wi-Fi connection detector detects that a Wi-Fi connection to a Wi-Fi access point has been broken.

The Wi-Fi data communication system may be configured to implement one or more user-provided policies governing connection of the Wi-Fi data communication system to Wi-Fi access points.

The operational condition detection system may include a motion sensor and a battery use detector. An operational condition may include when the motion sensor senses that the wireless mobile communication device has been substantially motionless and the battery use detector detects that the wireless mobile communication device is not operating on battery power.

Non-transitory, tangible, computer-readable storage media may contain computer programming instructions which, when executed by a computer processing system within a wireless mobile communication device of any of the types described herein, may cause the wireless mobile communication device to perform one or more of the functions described herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
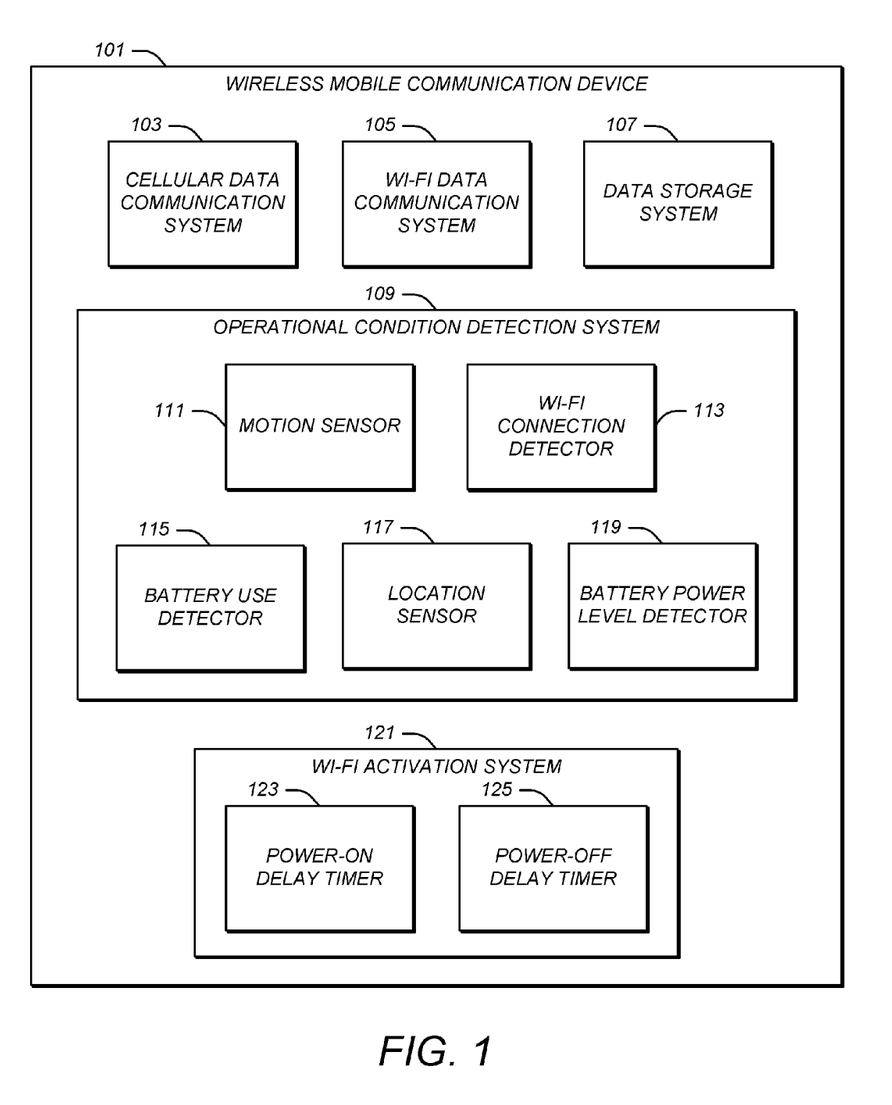
FIG. 1 illustrates a wireless mobile communication device with autonomous Wi-Fi control.

FIG. 1 illustrates a wireless mobile communication device with autonomous Wi-Fi control. As illustrated in FIG. 1, a wireless mobile communication device 101 may include a cellular data communication system 103, a Wi-Fi data communication system 105, a data storage system 107, an operational condition detection system 109, and a Wi-Fi activation system 121.

The wireless mobile communication device 101 may be of any type. For example, it may be a smart phone, a mobile game console, e-book readers, tablet computers. The wireless mobile communication device 101 may include additional components and/or not all of the components illustrated in FIG. 1.

The cellular data communication system 103 may be configured to wirelessly connect to a cellular data communication network, such as to a 3G cellular network. The cellular data communication system 103 may be configured to wirelessly communicate data between the wireless mobile communication device and the cellular data communication network.

The Wi-Fi data communication system 105 may be configured to wirelessly connect to a Wi-Fi access point and to wirelessly communicate data between the wireless mobile communication device 101 and the Wi-Fi access point. The Wi-Fi data communication system 105 may include a user-operated control configured to allow the user to manually turn the Wi-Fi data communication system 105 on and off. When turned on autonomously or manually, the Wi-Fi data communication system 105 may be configured to autonomously establish a wireless connection with a Wi-Fi access point. Once connected, the wireless mobile communication device 101 may be configured to communicate data over the Wi-Fi access point, rather than over the cellular data communication network.

The Wi-Fi data communication system 105 may be configured to implement one or more user-provided policies governing connection of the Wi-Fi data communication system 105 to Wi-Fi access points. For example, a user-provided policy may include a password to a particular Wi-Fi access point and may direct the Wi-Fi data communication system 105 to automatically connect to this particular Wi-Fi access point, when detected, using this password. Another user-provided policy may permit the Wi-Fi data communication system 105 to connect to any access point which does not require a password. A still further user-provided policy may prohibit the Wi-Fi data communication system 105 from connecting to an access point which is not secure and/or to one or more specifically-identified access points.

The data storage system 107 may be configured to store a user-setting in the wireless mobile communication device indicating that the wireless mobile communication device should not transmit, such as when a user is on an airplane.

The operational condition detection system 109 may be configured to detect one or more operational conditions of the wireless mobile communication device, other than actuation of a user-operated control. To facilitate this detection, the operational condition detection system 109 may include a motion sensor 111, a Wi-Fi connection detector 113, a battery use detector 115, a location sensor 117, and a battery power level detector 119.

The motion sensor 111 may be configured to sense motion of the wireless mobile communication device 101. The motion sensor 111 may be of any type. For example, the motion sensor 111 may include a gyroscope and/or an accelerometer. The motion sensor 111 may in addition or instead determine motion based on changes in position, as detected by the location sensor 117 (discussed in more detail below).

The Wi-Fi connection detector 113 may be configured to detect when a connection to a Wi-Fi access point been established and/or broken. Although illustrated as separate from the Wi-Fi data communication system 105, the Wi-Fi connection detector 113 may be part of it.

The battery use detector 115 may be configured to detect when the wireless mobile communication device is not operating on battery power. For example, the battery use detector 115 may be configured to detect when the wireless mobile communication device is being powered by an external power source and/or when an internal battery in the wireless mobile communication device is being recharged.

The location sensor 117 may be configured to determine when the wireless mobile communication device is near a Wi-Fi access point. The location sensor may be configured to first determine the location of the wireless mobile communication device. The location sensor 117 may include any type of location sensor for this purpose, including cell tower triangulation technology and/or GPS technology. The location sensor 117 may in addition or instead be configured to determine location based on movement information provided by the motion sensor 111.

The location sensor 117 may be configured to determine when the wireless mobile communication device is near a Wi-Fi access point by comparing the determined location of the wireless mobile communication device to known locations of Wi-Fi access points. These known locations may be obtained from any source.

For example, the location sensor 117 may be configured to cause the wireless mobile communication device to query an external database of known Wi-Fi access point locations, such a database maintained on a server accessible over the Internet. Once queried, this information may be stored locally in the data storage system 107 for future access.

Each time the Wi-Fi data communication system 105 establishes a connection with a Wi-Fi access point, the location of the wireless mobile communication device may be detected by the location sensor 117 and stored in the data storage system 107 for future access. The data storage system 107 may be configured to also store information indicative of the number of times each Wi-Fi access point has been used by the wireless mobile communication device 101.

The location sensor 117 may be configured to determine that the wireless mobile communication device is near a Wi-Fi access point, even when the wireless communication device is not in access range of the Wi-Fi access point. This may occur, for example, when the location sensor 117 relies upon triangulation as the means of determining location. The triangulation technology may not be adequate to determine location to the degree of accuracy needed to know whether the wireless mobile communication device 101 is within access range of a Wi-Fi access point.

The battery power level detector 119 may be configured to detect information indicative of the charge level of a battery that powers the wireless mobile communication device 101. The battery power level detector 119 may be part of a battery charging system and may utilize any of the well known technologies for accomplishing this function.

The Wi-Fi activation system 121 may be configured to autonomously turn power on to the Wi-Fi data communication system 105 upon detection of an operational condition of the wireless mobile communication device by the operational condition detection system 109, other than actuation of a user-operated control. The operational condition may be any of the operational conditions detected by the operational condition detection system 109.

For example, the operational condition may be when the motion sensor 111 senses that the wireless mobile communication device has been substantially motionless. Substantially motionless may include circumstances when there is still localized motion of the wireless mobile communication device 101, such as might be caused when the device is in a shirt pocket of a person who is eating lunch at a restaurant. The Wi-Fi activation system 121 may be configured to characterize such localized movement as substantially motionless.

The Wi-Fi activation system 121 may more specifically be configured to determine that the wireless mobile communication device 101 has been substantially motionless when the motion sensor 111 indicates that the wireless mobile communication device 101 has not moved at an average velocity in excess of a threshold during a pre-determined period. For example, the Wi-Fi activation system 121 may be configured to determine that the wireless mobile communication device 101 has been substantially motionless when the motion sensor 111 indicates that the average velocity of the wireless mobile communication device 101 during a 10, 30 or 60 second interval is less than one mile per hour. Other thresholds and/or intervals may be used instead.

The Wi-Fi activation system 121 may be configured to autonomously turn power off to the Wi-Fi data communication system 105, after autonomously turning power on to the Wi-Fi data communication system, upon detection of an operational condition of the wireless mobile communication device by the operational condition detection system, other than actuation of a user-operated control. For example, the operational condition may be when a Wi-Fi connection to a Wi-Fi access point cannot be established, based on the failure of the Wi-Fi connection detector 113 to detect that a Wi-Fi connection to a Wi-Fi access point has been established after one or more attempts. The inability to establish a Wi-Fi connection may for example be due to a technical problem in negotiating a connection, a security problem, and/or a policy prohibition.

As another example, the operational condition may be when the Wi-Fi connection detector 113 detects that a Wi-Fi connection to a Wi-Fi access point has been broken. This may occur, for example, when the wireless mobile communication device 101 is moved out of range of the Wi-Fi access point after a connection has been established.

The Wi-Fi activation system 121 may include a power-on delay timer 123. The power-on delay timer 123 may be configured to prevent the Wi-Fi activation system 121 from autonomously turning power on to the Wi-Fi data communication system, notwithstanding detection of an operational condition by the operational condition detection system 109, for a pre-determined waiting period after the Wi-Fi activation system 121 has autonomously turned power off to the Wi-Fi data communication system.

For example, the Wi-Fi activation system 121 may autonomously turn power on to the Wi-Fi data communication system 105 when the wireless mobile communication device 101 has been substantially motionless, but the Wi-Fi data communication system 105 may be unable to establish a connection. In this circumstance, the Wi-Fi activation system 121 may then autonomously turn power off to the Wi-Fi data communication system 105 to avoid a needless drain on power. The power-on delay timer 123 may then prevent the Wi-Fi activation system 121 from again turning power on to the Wi-Fi data communication system 105 for a pre-determined period, even though the wireless mobile communication device 101 remains substantially motionless. The pre-determined period may be of any length, such as between ten minutes and one hour.

The power-on delay timer 123 may be configured to prematurely terminate the pre-determined waiting period when the motion sensor 111 senses that the wireless mobile communication device has moved substantially after initiation of the pre-determined waiting period. In other words, if the wireless mobile communication device 101 is moved in a substantial way during the pre-determined power-off period, the Wi-Fi data communication system 105 may again be able to establish a connection to a data access point, thus justifying the Wi-Fi activation system 121 again applying power to the Wi-Fi data communication system 105 as soon as the wireless mobile communication device 101 again becomes substantially motionless. Movement in a substantial way may be equated with movement beyond that which is deemed to be substantially motionless.

The Wi-Fi activation system 121 may be configured not to autonomously turn power on to the Wi-Fi data communication system 105, notwithstanding detection of an operational condition by the operational condition detection system, if the data storage system 107 is storing a user-setting indicating that the wireless mobile communication device 101 should not transmit.

The Wi-Fi activation system 121 may be configured to autonomously turn power on to the Wi-Fi data communication system when the battery use detector 115 detects that the wireless mobile communication device 101 is not operating on battery power. In this circumstance, the Wi-Fi activation system 121 may be configured to keep power on the Wi-Fi data communication system 105, regardless of whether connection to an access point can be established, whether connection to an access point has been broken, the status of the pre-determined period in the power-on delay timer 123, and/or any other circumstance. In a different configuration, the Wi-Fi activation system 121 may be configured to autonomously turn power off to the Wi-Fi data communication system 105 if any of these circumstances occur, even if the wireless mobile communication device 101 is not operating on battery power.

The Wi-Fi activation system 121 may be configured to autonomously turn power on to the Wi-Fi data communication system 105 when the location sensor 117 senses that the wireless mobile communication device 101 is near a Wi-Fi access point.

The Wi-Fi activation system 121 may be configured not to autonomously turn power on to the Wi-Fi data communication system, notwithstanding that the location sensor 117 senses that the wireless mobile communication device 101 is near a Wi-Fi access point, when that access point has not been used more than a pre-determined number of times by the wireless mobile communication device 101 for data communication. This may be done, for example, when the location sensor 112 is determining nearness to a Wi-Fi access point based on triangulation. Triangulation could result in a nearness determination, even though the wireless mobile communication device 101 is thousands of feet away from the access point and thus beyond connection range. In this circumstance, it may not be worthwhile to turn power on to the Wi-Fi communication system 105, unless the nearby access point is a popular one with the user. Otherwise, the user may not be likely to come within access range of that access point.

The Wi-Fi activation system 121 may include a power-off delay timer 125 configured to prevent the Wi-Fi activation system 121 from concluding that connection to a Wi-Fi access point cannot be established until after a pre-determined time period after the Wi-Fi data communication system has been turned on. The pre-determined period may be in excess of 10, 30, or 60 minutes. This may give the user time to move in range of a Wi-Fi access point which has been determined to be near the current location of the wireless mobile communication device 101.

The Wi-Fi activation system 121 may be configured not to autonomously turn power on to the Wi-Fi data communication system, notwithstanding detection of an operational condition of the wireless mobile communication device by the operational condition detection system, when the battery power level detector detects that the charge level of the battery is below a pre-determined threshold. This may be particularly useful when the operational condition is nearness to a Wi-Fi access point, based on triangulation. In this circumstance, it may take a long time for a user to come within access range of a popular access point, which may be too long of a drain on a weak battery.

Figure 2:
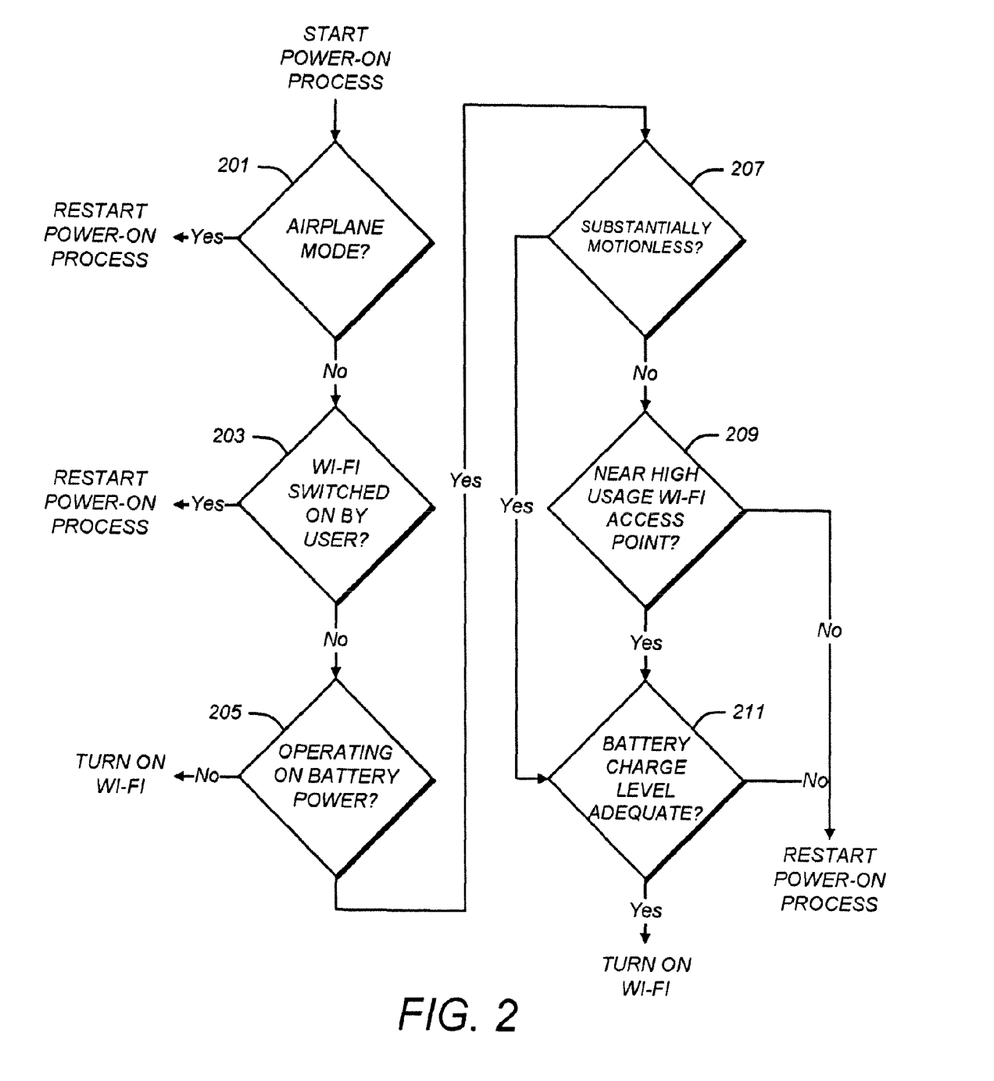
FIG. 2 illustrates a process of autonomously turning on a Wi-Fi data communication system.

FIG. 2 illustrates a process of autonomously turning on a Wi-Fi data communication system. This process may be implemented by the wireless mobile communication device 101 illustrated in FIG. 1 and will be discussed in this context. However, the process may be implemented by a different type of wireless mobile communication device. Similarly, the wireless mobile communication device 101 may implement a different process.

As illustrated by the Airplane Mode? step 201 in FIG. 2, the Wi-Fi activation system 121 may check whether there is a user-setting indicating that the wireless mobile communication device should not transmit, such as is commonly provided when the wireless mobile communication device has been set in airplane mode. This information may be stored in the data storage system 107. If so, the process may repeatedly restart until that indication is removed.

If there is no indication that the wireless mobile communication device should not transmit, or once such an indication has been removed, the Wi-Fi activation system 121 may determine whether the user has manually applied power to the Wi-Fi data communication system 105, as reflected by a Wi-Fi Switched On By User? step 203. If so, the process may repeatedly restart until this indication is removed. In the interim, power to the Wi-Fi data communication system 105 may remain on, as requested by the user.

The Wi-Fi activation system 121 may check to determine whether the wireless mobile communication device 101 is operating on battery power, as reflected by an Operating On Battery Power? step 205. The Wi-Fi activation system 121 may make this determination by communicating with the battery use detector 115. If the wireless mobile communication device is not operating on battery power, the Wi-Fi activation system 121 may be configured to autonomously turn power on to the Wi-Fi data communication system 105.

Conversely, if the wireless mobile communication device 101 is operating on battery power, the Wi-Fi activation system 121 may be configured to next determine whether the wireless mobile communication device 101 has been substantially motionless, as reflected by a Substantially Motionless? step 207. The Wi-Fi activation system 121 may make this determination by communicating with the motion sensor 111. If so, the Wi-Fi activation system 121 may autonomously apply power to the Wi-Fi data communication system 105.

If not, the Wi-Fi activation system 121 may check to see whether the wireless mobile communication device 101 is near a Wi-Fi access point, as reflected by a Near Wi-Fi Access Point? step 209. The Wi-Fi activation system 121 may make this determination by communicating with the location sensor 117. The Wi-Fi activation system 121 may eliminate from the Wi-Fi access points which are considered those that have not been used for more than a pre-determined number of times by the wireless mobile communication device for data communication. The Wi-Fi activation system 121 may obtain this historical data from the data storage system 107.

If the wireless mobile communication device 101 is near a Wi-Fi access point or one that has been frequently used, the Wi-Fi activation system 121 may check to see whether the charge level of the battery is at least at a pre-determined threshold, as reflected by a Battery Charge Level Adequate? step 211. This threshold may be set at a level that insures that the battery will have sufficient power to power the Wi-Fi communication system 105 while the system waits for the user to move the wireless mobile communication device 101 within range of the nearby Wi-Fi access point, as well as power to maintain data communications thereafter. If so, the Wi-Fi activation system 121 may apply power to the Wi-Fi data communication system 105. If the wireless data communication device 101 is not near a Wi-Fi access point or if the charge level of the battery is below the pre-determined threshold, the Wi-Fi activation system may instead restart the power-on process.

The steps of the power-on process may be different from what has been illustrated and discussed. For example, the process may not include testing for airplane mode, for whether operations are on battery power, for whether the wireless mobile communication device has been substantially motionless, for whether a Wi-Fi access point is near, and/or for whether the battery charge level is adequate. The steps of the process may also be in a different order. Additional tests may be included.

Figure 3:
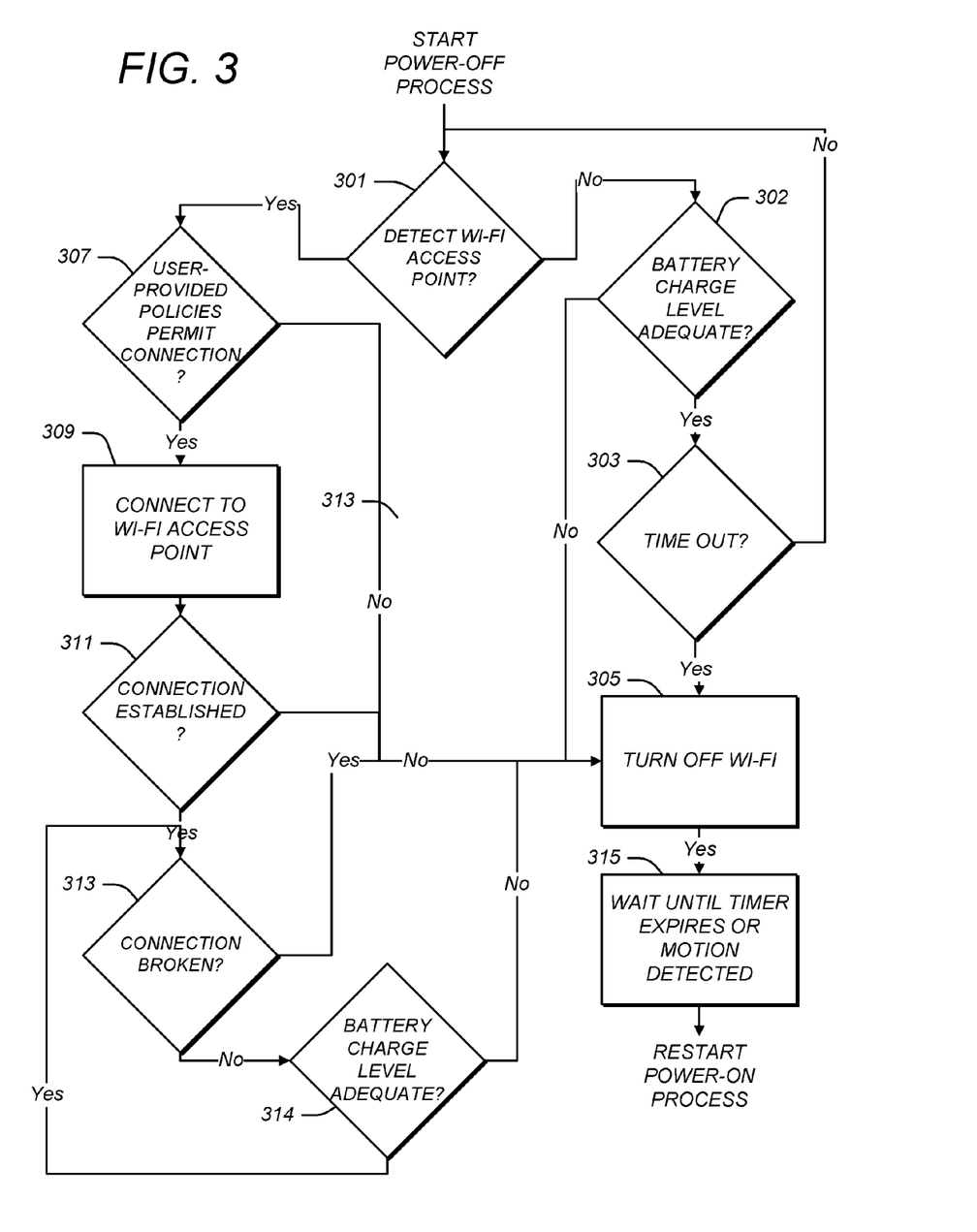
FIG. 3 ILLUSTRATES A PROCESS OF AUTONOMOUSLY TURNING OFF A WI-FI DATA COMMUNICATION SYSTEM.

FIG. 3 illustrates a process of autonomously turning off a Wi-Fi data communication system. This process may be used and will now be discussed in conjunction with the wireless mobile communication device 101 illustrated in FIG. 1 and the process of autonomously turning on a Wi-Fi data communication system illustrated in FIG. 2. However, the process may be used in conjunction with a different wireless mobile communication device and/or a different process of autonomously turning on a Wi-Fi data communication system. Similarly, the wireless mobile communication device 101 illustrated in FIG. 1 and/or the process of autonomously turning on a Wi-Fi data communication system illustrated in FIG. 2 may be used in conjunction with a different process of autonomously turning off a Wi-Fi data communication system.

After the Wi-Fi data communication system is powered on, the Wi-Fi activation system 121 may check whether a Wi-Fi access point has been detected, as reflected by a Detect Wi-Fi Access Point? step 301. The Wi-Fi activation system 121 may do so by communicating with the Wi-Fi data communication system 105. If not, the Wi-Fi activation system 121 may check to see whether sufficient time has been given for the wireless mobile communication device 101 to be brought within range of a Wi-Fi access point, as reflected by a Time Out? step 303. The power-off delay timer 125 may provide this time out information. This time out may be particularly useful when the Wi-Fi data communication system has been turned on in response to detection of the wireless mobile communication device 101 as being near a Wi-Fi access point by a location sensor 117 that is not very accurate (e.g., one that uses signal triangulation). The time out period may be any amount, such as at least 15, 30 or 60 minutes.

The time out period may be changed when the Wi-Fi data communication system 105 has been turned on for other reasons, such as due to substantial motionless of the wireless mobile communication device 101 and/or when the device is not operating on battery power. In these other circumstances, the time out may be substantially reduced to the time needed for the Wi-Fi data communication system 105 to detect a Wi-Fi access point.

If a Wi-Fi access point is not detected by the end of the time out period, the Wi-Fi activation system may turn power off to the Wi-Fi data communication system 105, as reflected by a Turn Off Wi-Fi step 305.

If a Wi-Fi access point is detected within the time out period, on the other hand, the Wi-Fi data communication system 105 may determine whether any applicable user-provided policies permit a connection to the detected Wi-Fi access point, as reflected by a User-Provided Policies Permit Connection? step 307. As explained above, one user policy may seek to automatically connect to an access point to which a connection point has previously been established, while another user policy may prohibit connections to certain access points, such as unsecured access points. If a connection is permitted by a user-provided policy, the Wi-Fi data communication system 105 may seek to connect to the Wi-Fi access point, as reflected by a Connect to Wi-Fi access point step 309. If a connection is not permitted, on the other hand, the Wi-Fi activation system 121 may turn power off to the Wi-Fi data communication system 105, as reflected by the Turn Off Wi-Fi step 305.

The Wi-Fi activation system 121 may check to see whether a connection has been established, as reflected by a Connection Established? step 311. If not, the Wi-Fi activation system 121 may turn power off to the Wi-Fi data communication system 105, as reflected by the Turn Off Wi-Fi step 305. If a connection has been established, on the other hand, the Wi-Fi activation system 121 may check to see if the connection has been broken, as reflected by a Connection Broken? step 313. The Wi-Fi activation system may do so by communicating with the Wi-Fi connection detector 113. If the connection has not been broken, the Wi-Fi activation system 121 may wait until the connection has been broken. If and when the connection has been broken, on the other hand, the Wi-Fi activation system 121 may turn power off to the Wi-Fi data communication system 105, as reflected by the Turn Off Wi-Fi step 305.

Although not shown in FIG. 3, the Wi-Fi activation system 121 may check whether the wireless mobile communication device 101 has substantially moved while the Wi-Fi connection is ongoing and, if so, turn off power to the Wi-Fi data communication system 105 upon such detection. The Wi-Fi activation system 121 may make this check by communicating with the motion sensor 111.

After power to the Wi-Fi data communication system 105 has been turned on and then turned off, the Wi-Fi activation system 121 may wait for a predetermined period, as determined by the power-on delay timer 123, as reflected by a Wait step 315. Thereafter, the power-on process may repeat. As explained above, this pre-determined period may be truncated in the event that substantial motion of the wireless data communication device 101 is detected by the motion sensor 111.

The steps of the power-off process may be different from what has been illustrated and discussed. There may be more or less steps and the steps may be in a different order.

The various components which have thus-far been described, such as the wireless mobile communication device 101, the cellular data communication system 103, the Wi-Fi data communication system 105, the data storage system 107, the operational condition detection system 109, the motion sensor 111, the Wi-Fi connection detector 113, the battery use detector 115, the location sensor 117, the battery power level detector 119, the Wi-Fi activation system 121, the power-on delay timer 123, and the power-off delay timer 125, may be implemented with electronic hardware configured to perform the functions which these components are described herein as performing in accordance with well-established technologies. Software, including an operating system and associated application programming instructions, may be included in connection with each component to facilitate their described functionality.

Non-transitory, tangible, computer-readable storage media may be configured with computer programming instructions. The media may include one or more CDs, DVDs, hard drives, and/or flash memories. The programming instructions may be configured, when executed by a computer processing system within a wireless mobile communication device, to cause the cellular data communication system 103, the Wi-Fi data communication system 105, the data storage system 107, the operational condition detection system 109, the motion sensor 111, the Wi-Fi connection detector 113, the battery use detector 115, the location sensor 117, the battery power level detector 119, the Wi-Fi activation system 121, the power-on delay timer 123, and the power-off delay timer 125, to perform the functions described above for these components.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A wireless mobile communication device comprising:
a Wi-Fi data communication system configured to wirelessly connect to a Wi-Fi access point and to wirelessly communicate data between the wireless mobile communication device and the Wi-Fi access point;
an operation condition detection system, including:
   a location sensor configured to detect a turn-on operational condition of the wireless mobile communication device, other than actuation of a user-operated control, including when the location sensor determines that the wireless mobile communication device is near a Wi-Fi access point; and
   a battery power level detector configured to detect information indicative of the charge level of a battery that powers the wireless mobile communication device;
a data storage system configured to store locations of Wi-Fi access points and information indicative of a number of times each Wi-Fi access point has been used by the wireless mobile communication device for data communication; and
a Wi-Fi activation system configured to autonomously turn power on to the Wi-Fi data communication system upon detection of the turn-on operational condition of the wireless mobile communication device by the operational condition detection system, other than actuation of a user-operated control, including when the location sensor senses that the wireless mobile communication device is near a Wi-Fi access point that has been used more than a pre-determined number of times by the wireless mobile communication device for data communication,
wherein the Wi-Fi activation system is configured not to autonomously turn power on to the Wi-Fi data communication system, notwithstanding detection of the turn-on operational condition of the wireless mobile communication device by the operational condition detection system, when the battery power level detector detects that the charge level of the battery is below a pre-determined threshold.

2. The wireless mobile communication device of claim 1 wherein the Wi-Fi activation system is configured to autonomously turn power off to the Wi-Fi data communication system, after autonomously turning power on to the Wi-Fi data communication system, upon detection of a turn-off operational condition of the wireless mobile communication device by the operational condition detection system, other than actuation of a user-operated control.

3. The wireless mobile communication device of claim 2 wherein:
the Wi-Fi activation system is configured to autonomously turn power off to the Wi-Fi data communication system, notwithstanding detection of the turn-on operational condition of the wireless mobile communication device by the operational condition detection system, when the battery power level detector detects that the charge level of the battery has reached a pre-determined threshold.

4. The wireless mobile communication device of claim 2 wherein:
the operational condition detection system includes a Wi-Fi connection detector configured to detect when a connection to a Wi-Fi access point has been established; and
the turn-off operational condition is when the Wi-Fi connection detector detects that a Wi-Fi connection to a Wi-Fi access point cannot be established.

5. The wireless mobile communication device of claim 4 wherein the Wi-Fi activation system includes a power-off delay timer configured to prevent the Wi-Fi activation system from concluding that connection to a Wi-Fi access point cannot be established until after pre-determined time period after the Wi-Fi data communication system has been turned on.

6. The wireless mobile communication device of claim 2 wherein:
the operational condition detection system includes a Wi-Fi connection detector configured to detect when a connection to a Wi-Fi access point has been broken; and
the turn-off operational condition is when the Wi-Fi connection detector detects that a Wi-Fi connection to a Wi-Fi access point has been broken.

7. The wireless mobile communication device of claim 1 wherein the Wi-Fi data communication system is configured to implement one or more user-provided policies governing connection of the Wi-Fi data communication system to Wi-Fi access points.

8. The wireless mobile communication device of claim 1 wherein:
the operational condition detection system includes a motion sensor and a battery use detector; and
the turn-on operational condition includes when:
the motion sensor senses that the wireless mobile communication device has been substantially motionless; and
the battery use detector detects that the wireless mobile communication device is not operating on battery power.

9. The wireless mobile communication device of claim 2 further including a power-on delay timer, wherein, after autonomously powering off the Wi-Fi data communication system, the Wi-Fi activation system is configured to prevent activation of the Wi-Fi data communication system for a predetermined waiting period determined by the power-on delay timer.

10. The wireless mobile communication device of claim 9, further including a motion sensor, wherein, the Wi-Fi activation system is configured to prematurely terminate the predetermined waiting period when the motion sensor senses that the wireless mobile communication device has moved substantially after initiation of the predetermined waiting period.

11. The wireless mobile communications device of claim 1, wherein: the detection of the turn on condition further includes the location sensor sensing that the wireless communication device is near the Wi-Fi activation point that has been used more than the predetermined number of times and turning on power to the Wi-Fi data communication system when the wireless communications device is beyond connection range of the Wi-Fi activation point.

12. The wireless mobile communication device of claim 11, wherein the Wi-Fi activation system is further configured not to autonomously turn power on to the Wi-Fi data communications system upon detection of the turn-on operational condition when the location sensor senses that the wireless mobile communications device is near a further Wi-Fi access point that has not been used more than the predetermined number of times by the wireless mobile communication device for data communication.

13. Non-transitory, tangible, computer-readable storage media containing computer programming instructions which, when executed by a computer processing system within a wireless mobile communication device having:
a Wi-Fi data communication system configured to wirelessly connect to a Wi-Fi access point and to wirelessly communicate data between the wireless mobile communication device and the Wi-Fi access point;

an operation condition detection system, including:
- a location sensor, configured to detect a turn-on operational condition of the wireless mobile communication device, other than actuation of a user-operated control, including when the location sensor determines that the wireless mobile communication device is near a Wi-Fi access point; and
- a battery power level detector configured to detect information indicative of the charge level of a battery that powers the wireless mobile communication device; and a data storage system configured to store locations of Wi-Fi access points and information indicative of how frequently each Wi-Fi access point has been used by the wireless mobile communication device for data communication;

cause the computer processing system to function as a Wi-Fi activation system which autonomously turns power on to the Wi-Fi data communication system upon detection of the turn-on operational condition of the wireless mobile communication device by the operational condition detection system, other than actuation of a user-operated control, including when the location sensor senses that the wireless mobile communication device is near a Wi-Fi access point that has been used more than a pre-determined number of times by the wireless mobile communication device for data communication; and cause the Wi-Fi activation system not to autonomously turn power on to the Wi-Fi data communication system, notwithstanding detection of the turn-on operational condition of the wireless mobile communication device by the operational condition detection system, when the battery power level detector detects that the charge level of the battery is below a pre-determined threshold.

14. The non-transitory, tangible, computer-readable storage media of claim 13 wherein the computer programming instructions, when executed by the computer processing system, cause the Wi-Fi activation system to autonomously turn power off to the Wi-Fi data communication system, after autonomously turning power on to the Wi-Fi data communication system, upon detection of a turn-off operational condition of the wireless mobile communication device by the operational condition detection system, other than actuation of a user-operated control.

15. The non-transitory, tangible, computer-readable storage media of claim 14 wherein:
- the operational condition detection system includes a Wi-Fi connection detector configured to detect when a connection to a Wi-Fi access point has been established; and
- the turn-off operational condition is when the Wi-Fi connection detector detects that a Wi-Fi connection to a Wi-Fi access point cannot be established.

16. The non-transitory, tangible, computer-readable storage media of claim 15 wherein the computer programming instructions, when executed by the computer processing system, cause the Wi-Fi activation system to include a power-off delay timer configured to prevent the Wi-Fi activation system from concluding that connection to a Wi-Fi access point cannot be established until after pre-determined time period after the Wi-Fi communication system has been turned on.

17. The non-transitory, tangible, computer-readable storage media of claim 14 wherein:
- the operational condition detection system includes a Wi-Fi connection detector configured to detect when a connection to a Wi-Fi access point has been broken; and
- the turn-off operational condition is when the Wi-Fi connection detector detects that a Wi-Fi connection to a Wi-Fi access point has been broken.

18. The non-transitory, tangible, computer-readable storage media of claim 13 wherein the computer programming instructions, when executed by the computer processing system, cause the Wi-Fi data communication system to implement one or more user-provided policies governing connection of the Wi-Fi data communication system to Wi-Fi access points.

19. The non-transitory, tangible, computer-readable storage media of claim 13 wherein:
- the operational condition detection system includes a motion sensor and a battery user detector; and
- the turn-on operational condition includes when:
- the motion sensor senses that the wireless mobile communication device has been substantially motionless; and
- the battery use detector detects that the wireless mobile communication device is not operating on battery power.

* * * * *